United States Patent [19]

Bennett

[11] 4,132,218

[45] Jan. 2, 1979

[54] VACUUM PANEL

[76] Inventor: Christopher J. Bennett, Little Stratton, Moor Hall Lane, Danbury, Essex, England CM3 4ER

[21] Appl. No.: 858,219

[22] Filed: Dec. 7, 1977

[30] Foreign Application Priority Data

Dec. 10, 1976 [GB] United Kingdom ............... 51724/76

[51] Int. Cl.² .............................................. F24J 3/02
[52] U.S. Cl. .................................. 126/270; 29/400 C; 52/304; 52/308; 52/397; 52/398; 52/401; 52/790; 126/271; 156/104; 237/1 A; 428/34
[58] Field of Search .......................... 29/400 C, 526 R; 52/304, 308, 397, 398, 401, 616; 156/104; 428/34; 126/270, 271; 237/1 A

[56] References Cited

U.S. PATENT DOCUMENTS

| 3,694,299 | 9/1972 | Wagner | 52/304 |
| 3,832,254 | 8/1974 | Bowser et al. | 428/34 |
| 4,038,797 | 8/1977 | Hermann et al. | 52/616 |
| 4,080,482 | 3/1978 | Lacombe | 52/304 |

Primary Examiner—Leland A. Sebastian
Attorney, Agent, or Firm—Sughrue, Rothwell, Mion, Zinn and Macpeak

[57] ABSTRACT

A panel intended for use as a vacuum enclosure, comprising a pair of spaced sheets defining between them opposite walls of the enclosure, and a spacer assembly located between the sheets and adapted to maintain the sheets at the desired spacing, said spacer assembly comprising a pair of bearing pads positioned on the inside surfaces of the sheets at mutually opposite locations, a spacer element received between the bearing pads which spacer element is formed with substantially spherical bearing surfaces cooperating with the bearing pads, and spring means incorporated within the spacer assembly adapted to allow a limited degree of relative movement of the sheets in a direction substantially at right angles to the plane of the sheets.

21 Claims, 6 Drawing Figures

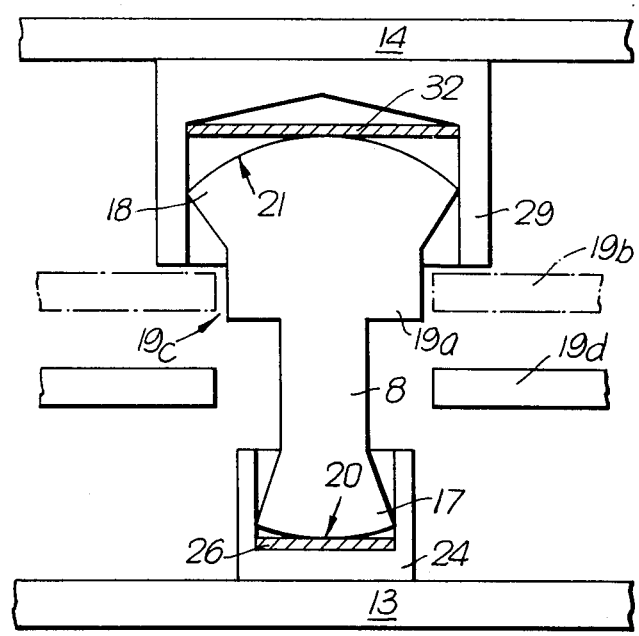
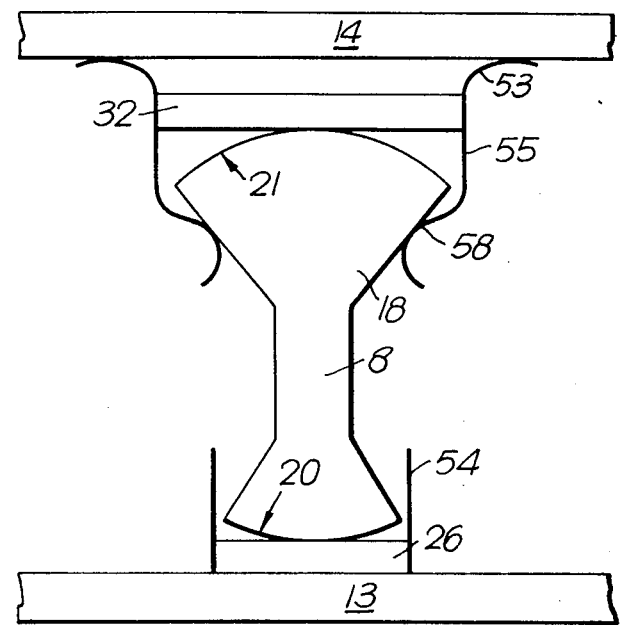

VACUUM PANEL

BACKGROUND OF THE INVENTION

1. Field of the Invention

This invention relates to vacuum enclosures and more particularly to spacers for location between two sheets defining opposite walls of a vacuum enclosure.

A pair of spaced rigid sheets of glass or similar transparent material is used in a number of applications to form opposite walls of a vacuum enclosure. Examples of such applications are double glazing units and solar panels in which a solar plate is located within the evacuated space between the sheets.

Where high degrees of vacuum are employed, spacers are necessary between the sheets in order to maintain the sheets at the correct spacing against the action of atmospheric pressure.

2. Description of the Prior Art

Particularly in the application to double glazing units or to solar panels, where high vacuums are employed, it has been found that in operation, relative movement between the sheets occurs as a result of expansion and contraction caused by differences in temperature of the sheets. The spacers between the sheets must therefore be designed to accommodate this relative movement. This ability to take up relative movement of the sheets also applies to the design of the vacuum seals around the edges of the enclosure, which, in addition to allowing this relative movement to take place, must at the same time maintain an effective vacuum seal.

It has been proposed to use rocking spacer pins, which are designed to rock following relative movement of the sheets. These spacer pins comprise a cylindrical shank formed at one end with a spherical bearing surface. Each end is received in the central recess of a counterbored washer which acts as a bearing plate to spread the load at the glass surfaces. The spacer pin pivots about the cylindrical end, and the spherical bearing surface at the other end is designed so that the pin has an equilibrium position at right angles to the glass surface. When the pin is rocked to either side of the equilibrium position, the curvature of the bearing surface is designed to move the glass sheets slightly apart, so that the force exerted by atmospheric pressure tends to return the pin to its equilibrium position.

It has been found that this simple design of spacer has certain problems. The spacers have to be made extremely accurately to ensure that they are all of equal length. If they are of unequal length, the glass is not supported uniformly and suffers breakages. Thus the length of each spacer pin and the thickness of each washer has to be made extremely accurately, or they have to be selected to ensure that the overall length of each spacer is equal. Also in continual use, the cylindrical end of the spacer can get worn and distorted, and tends to gouge out the surface of the counterbored washer, and this wear changes the effective overall length with time.

The present invention proposes a spacer assembly which provides an effective separation of the sheets whilst at the same time allowing relative movement thereof, and which is capable of accommodating small variations and tolerances in spacer length and in the thickness of the material of the sheets. The invention also provides a vacuum enclosure which incorporates these spacers, and which is provided with a simple but effective design of edge seal.

SUMMARY

According to the present invention, there is provided a panel intended for use as a vacuum enclosure, comprising a pair of spaced sheets defining between them opposite walls of the enclosure, and a plurality of spacer assemblies located between the sheets and adapted to maintain the sheets at the desired spacing, each of said spacer assemblies comprising a pair of bearing elements positioned on the inside surfaces of the sheets at mutually opposite locations, a spacer element received between the bearing elements which spacer element is formed with substantially spherical bearing surfaces cooperating with the bearing elements, and spring means incorporated within the spacer assembly adapted to allow a limited degree of relative movement of the sheets in a direction substantially at right angles to the plane of the sheets.

The degree of compressive movement in the spacer assembly provided by the spring means compensates for variations in overall length of the spacers where a plurality are employed in a vacuum enclosure, and takes into account any unevenness in the thickness of the sheets.

The action of the spacer pin with its essentially spherically shaped ends is to roll, like a ball bearing, between the two washers acting as bearing elements. But as this will not provide an equilibrium position for the two sheets defining the opposite walls of the vacuum enclosure, one at least of the washers may be curved so that the rocking action of the spacer is constrained to move back into the bottom of this curved well, or another appropriate return spring action may be incorporated to retun the pin and glass sheets to their equilibrium positions.

The compression spring means may be incorporated in the spacer shank e.g. the shank may be in two parts which can move together e.g. telescopically against the action of compressing the spring, or alternatively the spring means may be located between one of the spherical end faces of the shank and the associated bearing elements, or under one of the bearing elements.

In the preferred spacer assembly, at least one of the bearing elements or pads comprises a washer counterbored to provide a central recess in which the associated end of the spacer shank is received. A disc spring is located between the end of the shank and the closed end of the bore, and this disc spring deflects under load to provide the assembly with its compressive movement.

Suitably, the spacer pin is of metal such as steel, and comprises a generally cylindrical shank which terminates at each end in an enlarged frusto-conical end portion, the substantially spherical surfaces being formed on the ends of the frusto-conical portions. Preferably, the spherical surfaces have the same geometrical locus, i.e. they form part of the same geometrical spherical body, such as a ball bearing.

Preferably, both the bearing pads comprise counterbored washers, and where the sheets are of glass, these are suitably formed from a relatively soft metal material such as steel, copper or nickel in order to spread the load evenly over the glass surface to reduce stress concentrations and prevent splintering. To provide a suitable surface for the spherical end of the shank, each washer may be provided with a hard metal plate located at the base of the bore for engagement by the spacer pin.

Where a disc spring is provided, this is substituted for the metal plate.

The deflection of the disc spring also gives it the necessary curvature so that the rolling motion of the spacer pin causes the sheets to move apart slightly, atmospheric pressure giving the necessary restoring force to return the assembly to the required equilibrium position.

Preferably, the counterbored washers are crimped around the enlarged ends of the shank to form a unitary assembly which can be handled easily during manufacture of the vacuum enclosure.

Preferably, a plurality of these spacer assemblies are provided arranged in a triangular array. This gives the minimum number of spacers for a given area, whilst providing uniformly distributed support to the sheets.

Where the panel forms a vacuum enclosure, a vacuum seal is provided around the peripheral areas of the sheets, and because the relative position of the glass sheets is maintained by the design of the spacers, the vacuum seal does not have to provide any stiffness to the structure or to restrain relative movement. Support means such as a peripheral wall may however be provided for the vacuum seal. The vacuum preferably incorporates one or more vacuum ports for the application of reduced pressure between the sheets.

From another aspect the invention includes a panel in which edge sealing means comprising an edge sealing element supported by a peripheral wall member are provided extending between the bounding edges of the spaced sheets which sealing means include flanged side edge portions in fluid-tight relationship with the inner peripheral areas of the sheets and a wall portion extending between the sheets. The peripheral wall member has flanged side edge portions engaged against the inner surfaces of the flanged edge portions of the sealing means. The peripheral wall member may have an inwardly directed channel portion which forms a sprung cantilever link in the central zone of the wall member.

The edge sealing may be of sheet metal foil material and joined to the inside surfaces of the sheets by soldering to a metal coating provided around the margins of the sheets.

The edge sealing element may be provided with corrugations extending at right angles to the plane of the sheets so as to allow relative expansion thereof.

In an embodiment of the invention, an edge sealing element of thin sheet material is provided having flanged side edge portions extending in the plane of the glass sheets for abutment with the opposite surfaces thereof, and is suitably secured to the inner surfaces of the sheets. This thin sheet material may be provided with corrugations extending at right angles to the sheets for added strength, and to allow relative expansion of the sheets. In addition a peripheral supporting wall member is provided extending around the sheets and having flanged side edge portions extending in the plane of the sheets for abutment with the inside surfaces of the flanged edge sealing element, and may have one or more inwardly directed channel portions which form sprung cantilever links in the centre portion of the wall member. The sprung channel portion exerts a uniform pressure on the edge sealing element around the margins of the sheets to provide an effective sealing action, and the peripheral wall supports the edge sealing element against atmospheric pressure.

Further the invention includes a method of making a vacuum panel of the invention and comprises disposing two substantially rigid sheets in spaced relation and defining a space between them, locating a plurality of spaced spacer assemblies between the major surface areas of the sheets, applying supported edge sealing means in fluid-tight relationship with and extending between peripheral areas of the sheets to form a vacuum space therebetween, and applying a reduced pressure to said vacuum space, said spacer assemblies each having a pair of bearing elements in engagement with the inner faces of the sheets at mutually opposite locations, a spacer element engaged with and between the bearing elements and formed with substantially spherical bearing surfaces cooperating with the bearing elements and spring means incorporated within the spacer assembly permitting at least limited relative movement between the sheets and incorporating means operable to cause the displaced sheets to return to their initial equilibrium positions.

Preferably, the edge sealing element is of metal foil material, and may be joined to the sheets by soldering onto a metal coating provided around the margins of the sheets.

BRIEF DESCRIPTION OF THE DRAWINGS

FIG. 4 shows a cross-sectional view of a spacer assembly with a shoulder for alignment during assembly according to the invention; and FIG. 5 shows a cross sectional view of a spacer assembly, to illustrate other possible embodiments of the invention.

DESCRIPTION OF THE PREFERRED EMBODIMENTS

Figure 1:
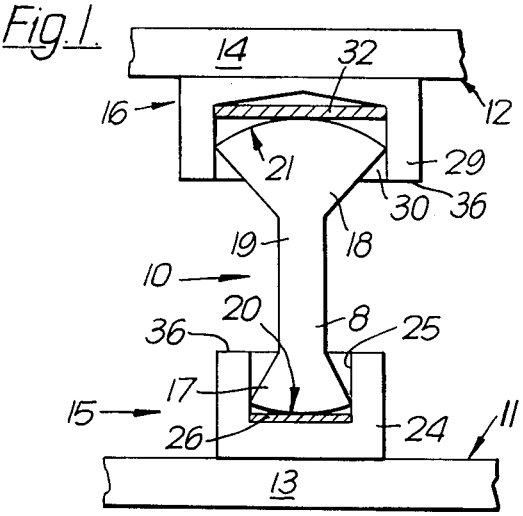
FIG. 1 shows a cross-sectional view of a spacer assembly according to the invention.

Referring to the drawings, FIG. 1 shows a spacer assembly generally indicated at 10 located between opposite surfaces 11 and 12 of a pair of parallel glass sheets 13 and 14 respectively. The glass sheets form opposite walls of an enclosure intended to be maintained at reduced pressure in order to reduce heat transmission by conduction.

The spacer assembly comprises a spacer pin 8 and a pair of bearing elements shown as pads 15 and 16 against which the ends of the spacer pin are supported. The spacer pin 8 is made for example from forged steel and comprises a cylindrical shank 19 terminating at each end in enlarged frusto-conical end portions 17 and 18. These end portions are provided with spherical bearing surfaces 20 and 21 respectively which form part of the same geometrical spherical body.

The bearing pad 16 comprises a counterbored washer 29 formed with a central recess 30 in which the end 18 of the pin 8 is received. At the bottom of the recess 30 is located a circular disc spring 32, and the recess is shaped to allow the disc spring to deflect towards the base. The spherical surface 21 of the end portion 18 rests on the disc 32. In FIG. 1, the disc spring is shown in an undeflected condition, i.e. prior to evacuating the space between the sheets 13 and 14.

The bearing pad 15 similarly comprises a washer 24 of soft metal material such as steel, copper, nickel, aluminium or an alloy of any of these metals, which is counterbored to provide a central recess 25 for receiving the end 17 of the pin 8. A disc 26 of hard metal material is located at the base of the recess 25 to act as a bearing surface for the spherical surface 20 of the spacer pin.

The bearing pads need not be fixed to the glass surfaces, but in use are held in place by the pressure exerted by the panels when the interior of the enclosure is evacuated. The use of a softer metal for the bearing pads spreads the load on the glass surfaces to prevent excessive localised forces and consequent splintering or breakages of the glass.

The ends 36 of the washers 24 and 29 are crimped around the enlarged ends of the spacer pin 8 during manufacture to enable the spacer assembly to be handled as a single unit. When the enclosure is evacuated, the spring disc 32 deflects under the atmospheric pressure acting on the sheets, and compensates for minor differences in length of the spacer assemblies between the sheets, at the same time overcoming any unevenness in the glass surface. As a result, the sheets are supported evenly over their entire surface and the breakage of the sheets is prevented.

During operating conditions of the enclosure, temperature differences between the sheets 13 and 14 cause relative movement of the glass surfaces 11 and 12, and a consequent sideways shift of one of the bearing pads relative to the other in each spacer assembly. During such a shift, the spherical bearing surfaces of the spacer pin 8 roll freely over the plate 26 and disc spring 32, preventing damage to the spacer pin and washer assembly.

The curvature of the spring disc 32 under load is designed so that a rolling movement of the spacer pin spreads the glass sheets slightly apart; atmospheric pressure, acting against the curved surface of the disc spring 32, provides the necessary restoring force which ensures that the spacers return the glass sheets to their equilibrium position shown in FIG. 1.

In a typical form of vacuum enclosure, the spacer assemblies are located 7.5 cm apart, and are required to support a force exerted by atmospheric pressure of about 50 kgm; a deflection of the disc spring of 0.15 mm is sufficient to overcome the variation in dimensions of the spacer assemblies and to spread the load evenly over the glass surfaces, and to provide the necessary curvature for the required restoring force.

Figure 2:
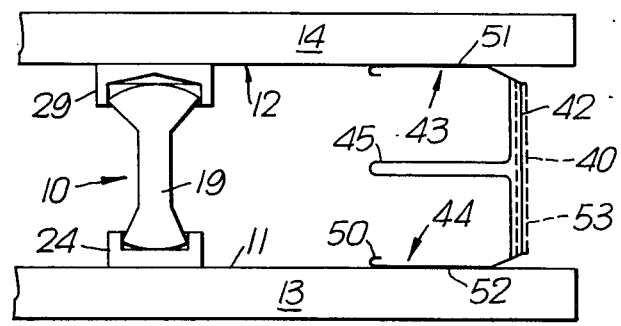
FIG. 2 shows the edge seal arrangement for a vacuum enclosure in which the spacers shown in FIG. 1 are used.

FIG. 2 shows a vacuum assembly which utilises spacers of the design shown in FIG. 1, and which incorporates side walls around the edges of the glass sheets 13 and 14. Such a vacuum enclosure might conveniently be used in the solar panel assembly described and claimed in my co-pending Application Ser. No. 650,397, now U.S. Pat. No. 4,080,957. In such as assembly, the solar plate 19b, 19d is supported between the glass sheets 13 and 14 with clearance holes provided for the spacers. In this application, as in FIG. 4, a shoulder may be provided on the shank of the spacer pin 8 so that the pin can be inserted and held in the appropriate hole in the solar plate during assembly of the panel. The solar plate is thus used as a jig for the spacers, which ensures that they are accurately located relative to the holes in the solar plate. In addition, this enables the holes in the solar plate to be made a minimum size, so that the surface area of the panel is as large as possible and efficiency is not impaired. When the panel is assembled and before sealing the solar plate can be moved off the shoulder 19a from the position at 19b to its final location 19d in the finished panel.

In another embodiment of the spacers shown in FIG. 5, to illustrate other possible methods of construction, the washers 24, 29 are shown as simple flat discs. At one end, the washer is retained against the spacer pin by a thin metal wall 54 which may be a tight fit or spot welded to the washer and crimped around the enlarged end of the spacer pin. At the other end, a spring metal element 55 is used comprising a shank 56, an annular roll 57 in engagement with the inner face of the sheet 14, and a spring means 58 engaging the frustoconical end portion 18 of the pin 8 and permitting relatively small movement of the pin relative to the sheet 14 in three dimensions. The flat washer is welded in place, and the supporting end roll 57 of the metal element 55 is spread out to give the required spring action against the glass sheets, and the other end of the metal wall is crimped around the adjacent enlarged end of the spacer pin. In this case the restoring force for the glass sheets is provided by the spring action of the spring metal element 55 operating against the sides of the spacer pin as it rolls away from the vertical position.

Various other combinations can be used where the spacer is shaped as a pin, or a rod, or a ball, and the ends may be spherical as for a ball, or close to spherical giving the appropriate or required rolling action. The supporting spring may be incorporated under the washer, or between the pin and washer, or in the pin itself.

Figure 3B:
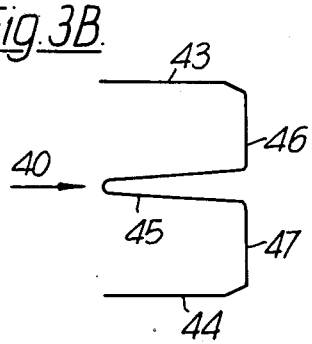
FIGS. 3A and 3B show detailed sectional views of parts of the edge seals shown in FIG. 2 before assembly.
Figure 3A:
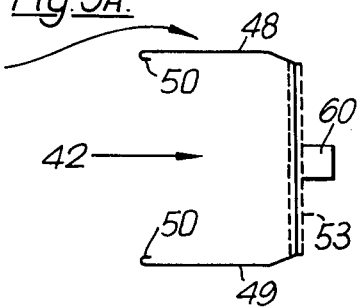

Because the relative position of the glass sheets 13 and 14 is maintained by a plurality of the spacer assemblies 10, the vacuum wall around the periphery of the glass sheets does not have to provide any stiffness for the structure or to restrain relative movement, and accordingly the wall can be made from thin metal material. In the embodiment shown in FIGS. 2 and 3, the vacuum wall comprises an outer foil sealing member 42 shown in detail in FIG. 3A, and a peripheral wall supporting member 40 shown in detail in FIG. 3B. The peripheral wall member 40 is formed from a spring metal material such as spring steel or spring nickel or copper alloy and extends around the inside periphery of the vacuum enclosure; it comprises side edge flanges 43 and 44 which are co-planar with the inner surfaces 11 and 12 of the sheets 13 and 14, and peripheral wall portions 46 and 47 joined by a central channel portion 45 which acts as a sprung cantilever link.

The edge sealing member 42 is formed from thin metal material such as copper foil 0.05 mm thick (although it could be made from nickel, or an alloy of either copper or nickel, or any other suitable metal) and is provided with flange surfaces 48 and 49 which are intended for sealing against the inner surfaces 11 and 12 of the glass sheets. Each flange portion 48 and 49 has a turned-over margin 50 which is wrapped around the edges of the flanges 43 and 44 (see FIG. 2) to retain the peripheral wall member 40 in position over the sealing member 42. The glass surfaces 11 and 12 are provided with a metallised peripheral zone at 51 and 52 and this is sealed by means of a solder joint to the outer surfaces of the flanges 48 and 49.

The cantilever link 45 acts as a spring member which exerts a uniform pressure through flanges 43 and 44 onto the flange seals 48 and 49 during the soldering operation thereby ensuring an effective seal between the glass sheets and the wall assembly. This spring link also allows the glass sheets to move apart relative to each other following relative expansion and contraction, as previously described. Lateral movement of the sheets can also be accommodated by the wall member 40 and the sealing member 42. In order to accommodate relative expansion, the foil seal 42 is provided with a series of corrugations 53 extending in a direction at right angles to the plane of the glass sheets, and is supported against atmospheric pressure by the wall portions 46 and 47 of the peripheral wall member 40.

The seal 42 can be provided with a pumping or vacuum port 60 which allows removal of air from the space between the glass plates sealed by the seal 42.

Other embodiments for the edge seals are possible where the thin metal foil is suitably ribbed or provided with vertical or horizontal corrugations, or a combination of these, and the thin vacuum wall is supported by a spring metal member which can flex appropriately by the provision of one or more suitable cantilever links.

Where the vacuum enclosure is used to contain a solar plate, for example as described in my co-pending Application Ser. No. 650,397, bellows seals are used at the exit points through the peripheral vacuum wall for the liquid or vapour circulation tubes associated with the solar plate. This enables the vacuum seal to be maintained despite relative expansion of the two glass sheets due to temperature differences, and also accommodates the larger relative expansion of the solar plate during processing and operation. The bellows seal connects the insulating sleeves around the liquid or vapour circulation tubes to the foil wall, facilitating the connection of a thicker metal tube to the thin metal foil of the vacuum walls, which can otherwise be a difficult problem.

While the spacer assemblies and the edge seals have been generally described in use with a vacuum enclosure formed by two parallel glass sheets, the invention is not restricted to the use of these items in a transparent panel, and they may be used in any vacuum application where two sheets are required to be maintained at a predetermined spacing.

I claim:

1. A panel intended for use as a vacuum enclosure, comprising a pair of spaced sheets defining between them opposite walls of said enclosure, a plurality of spacer assemblies located between said sheets and adapted to maintain said sheets at the desired spacing, each of said spacer assemblies comprising a pair of bearing elements positioned on the inside surfaces of said sheets at mutually opposite locations, a spacer element received between said bearing elements which spacer element is formed with substantially spherical bearing surfaces cooperating with said bearing elements, and spring means incorporated within each said spacer assembly adapted to allow a limited degree of relative movement of said sheets in a direction substantially at right angles to the plane of said sheets.

2. A panel as claimed in claim 1, wherein said spherical bearing surfaces have the same geometrical centre.

3. A panel as claimed in claim 1, wherein said spacer element comprising a spacer pin having enlarged end portions connected by a shank portion, and said spherical bearing surfaces are formed on the end faces of said enlarged end portions.

4. A panel as claimed in claim 3, wherein at least one of said bearing elements is formed with a recess receiving the respective end portion of said spacer pin.

5. A panel as claimed in claim 4, wherein said spring means comprises a disc spring positioned between the base of said recess and the spherical bearing face of the respective end portion of said spacer pin.

6. A panel as claimed in claim 5, wherein both of said bearing elements are formed with the recesses receiving the respective end portions of said spacer pin, and said elements are deformed at the outer edges of said recesses around the enlarged ends of said spacer pin to form a unitary assembly.

7. A panel as claimed in claim 1, wherein said bearing elements and said spring means are formed by an annular resilient member surrounding at least one end of said spacer pin and in engagement with the face of one of said sheets.

8. A panel as claimed in claim 1, wherein said spring means is incorporated in said spacer element.

9. A panel as claimed in claim 3, wherein the shank portion of said spacer pin is cylindrical, and said enlarged end portions are frusto-conical.

10. A panel as claimed in claim 1, wherein at least one of said sheets is glass, and said bearing elements and said spacer element are metal.

11. A panel as claimed in claim 1, wherein said spacer assemblies are provided between said spaced sheets and arranged in one or more triangular arrays.

12. A panel as claimed in claim 1, wherein edge sealing means comprising an edge sealing element supported by a peripheral wall member are provided extending between the bounding edges of said spaced sheets, said sealing element includes flanged side portions in fluid-tight relationship with the inner peripheral areas of said sheets and a wall portion extending between said sheets.

13. A panel as claimed in claim 12, wherein said peripheral wall member has flanged side portions engaged against the inner surfaces of said flanged edge portions of said sealing element.

14. A panel as claimed in claim 12, wherein said peripheral wall member has an inwardly directed channel portion which forms a spring cantilever link between said flanged portions.

15. A panel as claimed in claim 12, wherein said edge sealing element is of metal foil material, and is joined to the inside surfaces of said sheets by soldering to a metal coating provided around the margins of said sheets.

16. A panel as claimed in claim 12, wherein said edge sealing element is provided with corrugations extending at right angles to the plane of said sheets so as to allow relative expansion thereof.

17. A panel as claimed in claim 12, wherein the space defined between said sheets is maintained at reduced pressure and a vacuum port is provided through which the reduced pressure is applied.

18. A panel as claimed in claim 17, incorporating a solar heating element located in said space.

19. A panel as claimed in claim 18, wherein the spacing means includes an enlarged shank portion and the solar panel has an aperture engaged by the shank portion during erection of the panel.

20. A method of making a vacuum panel as claimed in claim 1, comprising disposing two substantially rigid sheets in spaced relation and defining a space between them, locating a plurality of spaced spacer assemblies between the major surface areas of said sheets, applying supported edge sealing means in fluid-tight relationship with and extending between peripheral areas of said sheets to form a vacuum space therebetween, and applying a reduced pressure to said vacuum space, said spacer assemblies each having a pair of bearing elements in engagement with the inner faces of said sheets at mutually opposite locations, a spacer element engaged with and between said bearing elements and formed with substantially spherical bearing surfaces cooperating with said bearing elements and said spring means incorporated within said spacer assembly permitting at least limited relative movement between said sheets and incorporating means operable to cause said displaced sheets to return to their initial equilibrium positions.

21. A method as claimed in claim 20, using a supported edge sealing means comprising a sealing element intended to extend between said sheets and having end flanges supported on edge flanges on a peripheral wall member, wherein said sealing means is located between the peripheral edge portions of said sheets and said sealing element flanges are secured in a fluid-tight manner to the inner faces of said sheets with the peripheral wall flanges urged into engagement with the inner faces of said sealing element flanges.

* * * * *